(12) United States Patent
Chen et al.

(10) Patent No.: US 10,442,044 B2
(45) Date of Patent: Oct. 15, 2019

(54) BEAM OF A GANTRY-TYPE STAGE STRUCTURE

(71) Applicant: HIWIN MIKROSYSTEM CORP., Taichung (TW)

(72) Inventors: Xin-Hua Chen, Taichung (TW); Chi-Pin Chou, Taichung (TW); Cheng-Yang Sung, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 15/891,679

(22) Filed: Feb. 8, 2018

(65) Prior Publication Data

US 2019/0240792 A1   Aug. 8, 2019

(51) Int. Cl.
| | | |
|---|---|---|
| *F16M 11/00* | (2006.01) | |
| *B23Q 1/01* | (2006.01) | |
| *B23Q 1/66* | (2006.01) | |
| *B23Q 1/26* | (2006.01) | |

(52) U.S. Cl.
CPC .............. *B23Q 1/012* (2013.01); *B23Q 1/26* (2013.01); *B23Q 1/66* (2013.01)

(58) Field of Classification Search
CPC ......... B23Q 1/012; B21D 47/00; B23K 20/10
See application file for complete search history.

(56) References Cited

U.S. PATENT DOCUMENTS

| | | | |
|---|---|---|---|
| 6,679,021 B2 * | 1/2004 | Maimon ................. | E04C 2/049 52/271 |
| 6,732,881 B1 * | 5/2004 | Gulati .................... | B21D 47/00 220/560.04 |
| 2014/0127454 A1 * | 5/2014 | Kuppers ................ | B23K 20/10 428/116 |

\* cited by examiner

*Primary Examiner* — Amy J. Sterling
(74) *Attorney, Agent, or Firm* — Rosenberg, Klein & Lee

(57) ABSTRACT

A beam of a gantry-type stage structure includes an accommodating space defined by a lower plate, an upper plate, a front plate, a rear plate and two lateral plates. A truss unit is disposed in the accommodating space, and includes lower and upper joint members which are respectively disposed on the lower and upper plates, first and second vertical members which extend uprightly from the lower and upper joint members, respectively, and diagonal members each of which extends to interconnect one lower joint member and an adjacent upper joint member to provide the beam with a great structural strength and a lightweight structure.

5 Claims, 8 Drawing Sheets

BEAM OF A GANTRY-TYPE STAGE STRUCTURE

FIELD

The disclosure relates to a gantry-type stage structure for mounting an optical processing device, and more particularly to a beam of a gantry-type stage structure.

BACKGROUND

A conventional gantry-type stage structure is provided with a beam disposed above and extending across a stationary base for an optical processing device to be mounted thereon. A beam as disclosed in Taiwanese Patent No. M401496 includes an elongated rectangular cuboid hollow body elongated in a left-and-right direction and defining an accommodating space therein, and a plurality of support plates disposed erectly in the accommodating space and arranged to be spaced apart from one another in the left-and-right direction. The hollow body has a housing wall which is formed with numerous screw holes therein such that an optical processing device such as an optical detecting or repair device is securely mounted on the housing wall for being moved therewith. Many support plates are required to be disposed compactly so as to provide the beam with a sufficient structural strength, which renders the beam weight heavy and hence adversely affects the processing operation of the beam. Additionally, it is needed to renew the whole body of the beam once some of the screw holes are damaged, causing the maintenance to be inconvenient.

SUMMARY

Therefore, an object of the disclosure is to provide a beam of a gantry-type stage structure that can alleviate at least one of the drawbacks of the prior art.

According to the disclosure, a beam of a gantry-type stage structure includes a lower plate, an upper plate, a front plate, a rear plate, two lateral plates and a truss unit. The lower plate is elongated in a left-and-right direction to terminate at two lateral end edges, and has a lower front end edge and a lower rear end edge opposite to each other in a front-and-rear direction that is normal to the left-and-right direction. The upper plate is elongated in the left-and-right direction, and is disposed above and spaced apart from the lower plate in an upper-and-lower direction that is normal to both the left-and-right direction and the front-and-rear direction. The upper plate has an upper front end edge and an upper rear end edge opposite to each other in the front-and-rear direction. The front plate is erected to interconnect the lower and upper front end edges. The rear plate is erected from the lower rear end edge. The lateral plates are erected from the lateral end edges, respectively. Each of the lateral plates interconnects the front and rear plates to cooperatively define an accommodating space thereamong. The truss unit is disposed in the accommodating space, and includes a plurality of lower joint members which are disposed on an upper major surface of the lower plate and which are spaced apart from each other in the left-and-right direction, a plurality of first vertical members which are erected from the lower joint members, respectively, to the upper plate, a plurality of upper joint members which are disposed on a lower major surface of the upper plate, and which are spaced apart from each other in the left-and-right direction, and which are arranged to alternate with the lower joint members in the left-and-right direction, a plurality of second vertical members which extend from the upper joint members, respectively, to the lower plate, and a plurality of diagonal members each of which extends to interconnect one of the lower joint members and an adjacent one of the upper joint members. With the truss unit, the beam of this disclosure can be made lighter in weight without compromising the structural strength thereof.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
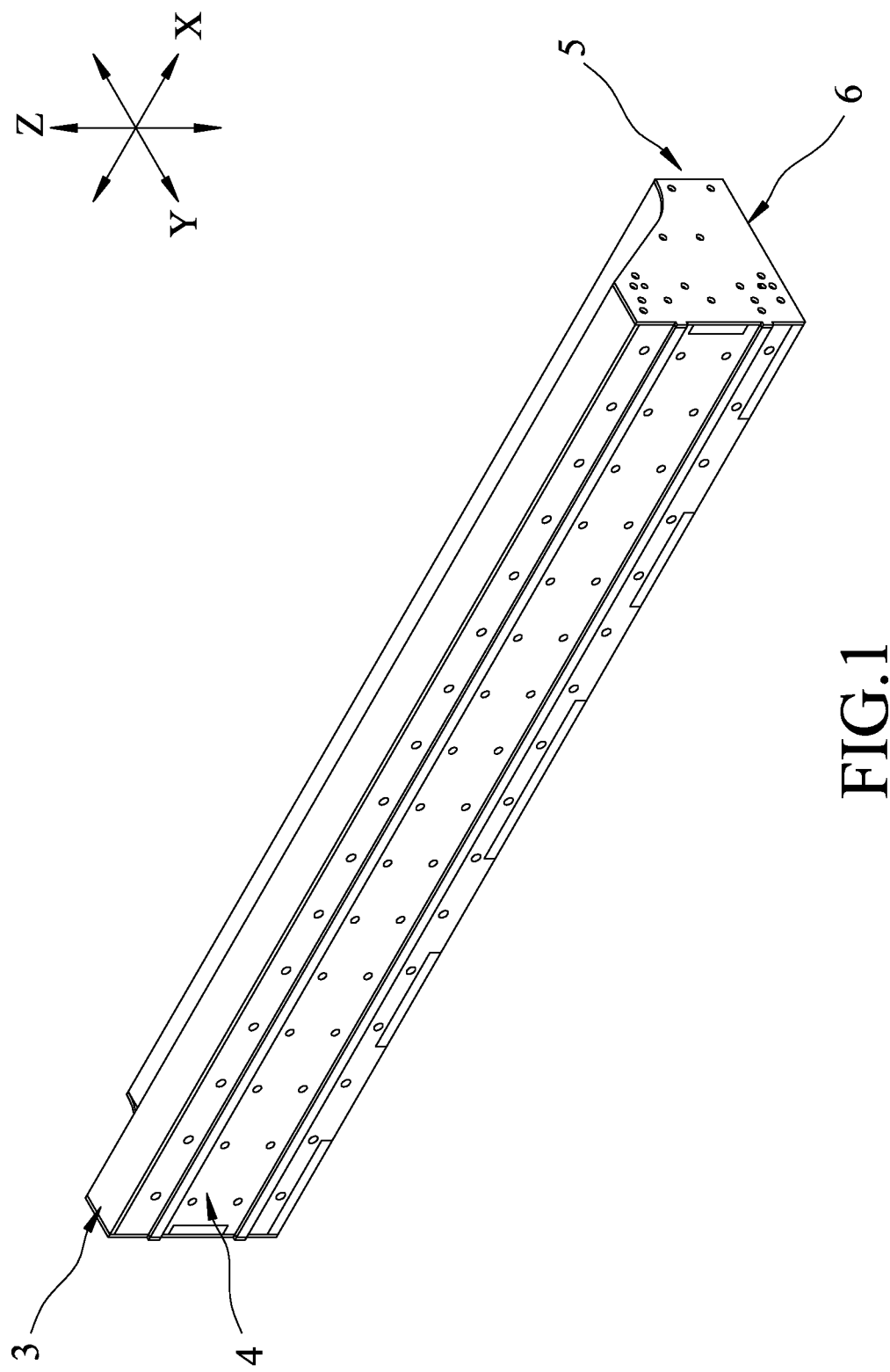
FIG. 1 is a perspective view illustrating a first embodiment of a beam of a gantry-type stage structure according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
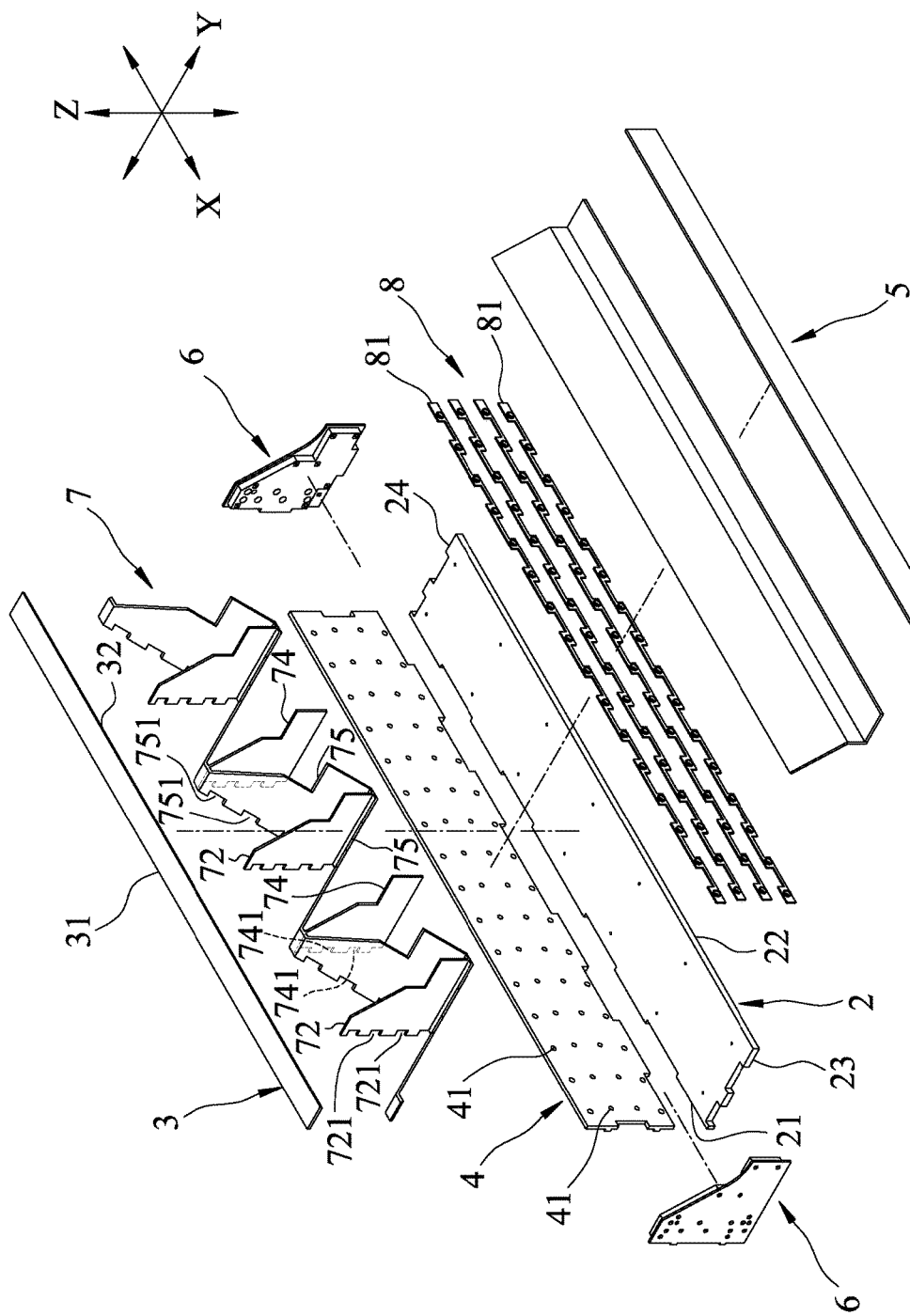
FIG. 2 is an exploded perspective view of the first embodiment.
Figure 3:
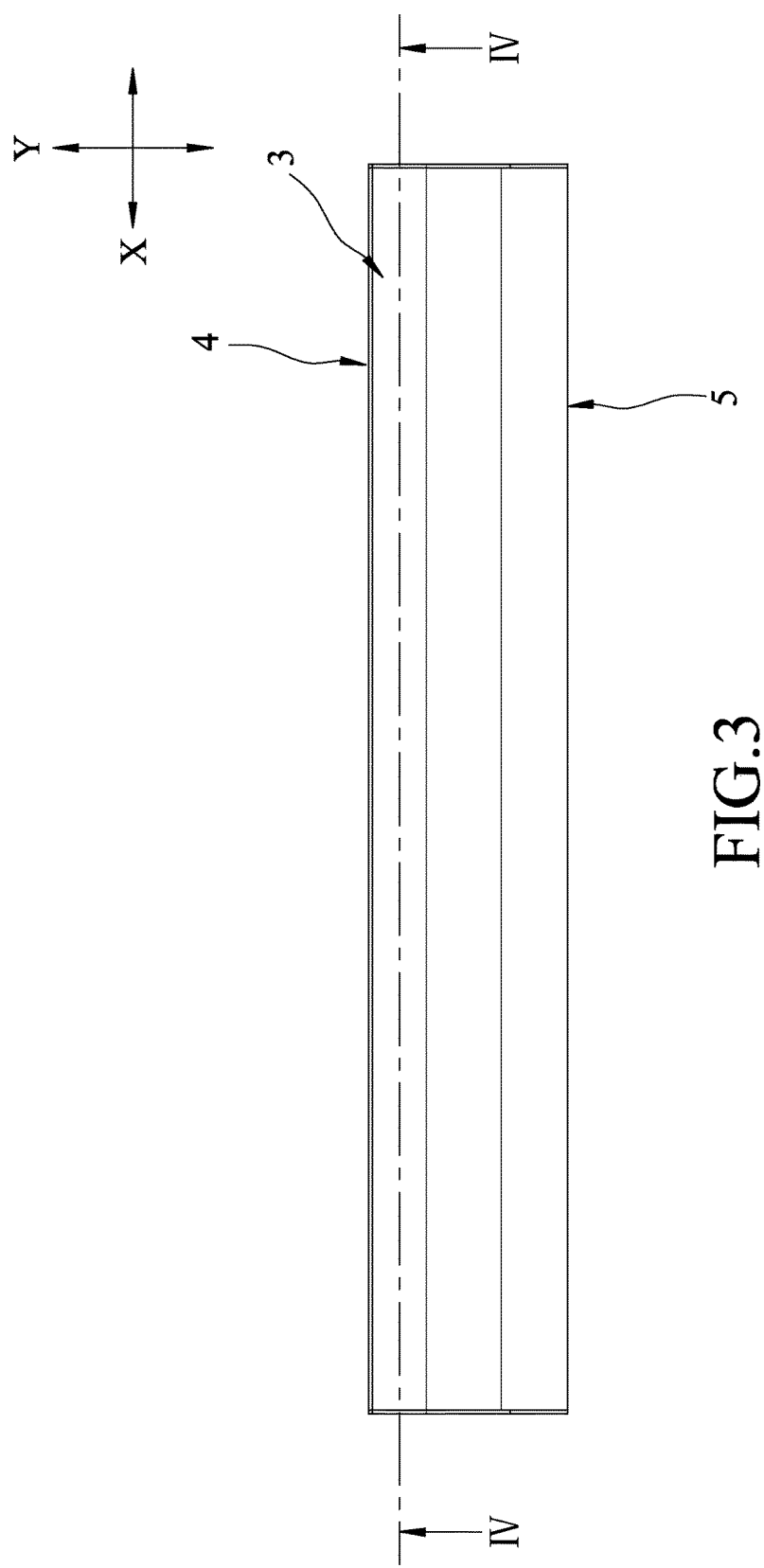
FIG. 3 is a top view of the first embodiment.

Referring to FIGS. 1 to 3, a first embodiment of a beam of a gantry-type stage structure according to the disclosure includes a lower plate 2, an upper plate 3, a front plate 4, a rear plate 5, two lateral plates 6, a truss unit 7 and a thread formed unit 8.

The lower plate 2 is elongated in a left-and-right direction (X) to terminate at two lateral end edges 23, 24, and has a lower front end edge 21 and a lower rear end edge 22 opposite to each other in a front-and-rear direction (Y) that is normal to the left-and-right direction (X).

The upper plate 3 is elongated in the left-and-right direction (X), and is disposed above and spaced apart from the lower plate 2 in an upper-and-lower direction (Z) that is normal to both the left-and-right direction (X) and the front-and-rear direction (Y). The upper plate 3 has an upper front end edge 31 and an upper rear end edge 32 opposite to each other in the front-and-rear direction (Y).

The front plate 4 is erected to interconnect the lower and upper front end edges 21, 31, and has a plurality of penetrating holes 41 which extend in the front-and-rear direction (Y).

The rear plate 5 is connected to and erected from the lower rear end edge 22.

Figure 4:
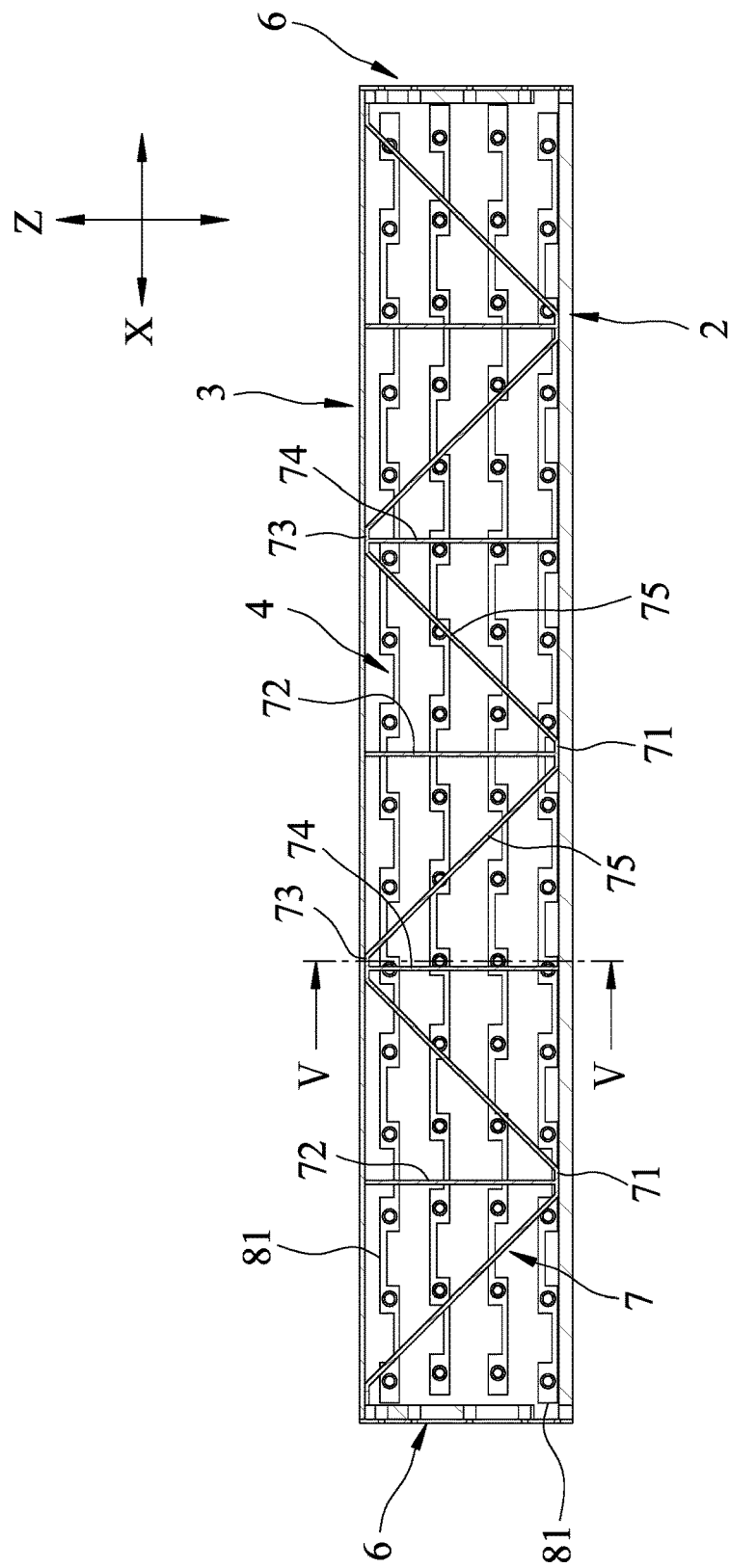
FIG. 4 is a sectional view taken along line IV-IV of FIG. 3.
Figure 5:
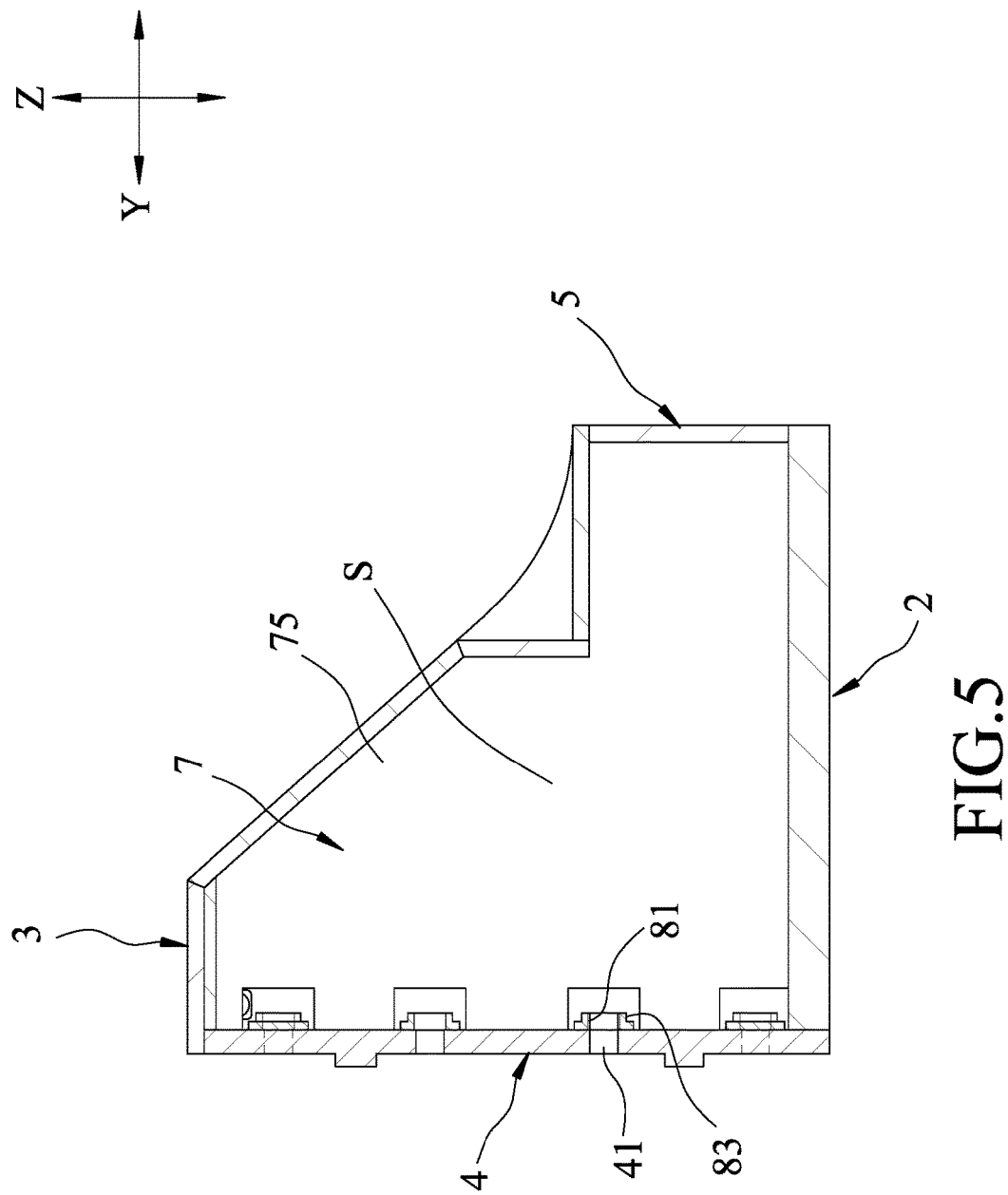
FIG. 5 is a sectional view taken along line V-V of FIG. 4.

With reference to FIGS. 2, 4 and 5, the two lateral plates 6 are connected to and erected from the lateral end edges 23, 24 of the lower plate 2, respectively. Each of the lateral plates 6 interconnects the front and rear plates 4, 5 to cooperatively define an accommodating space (S) thereamong.

The truss unit 7 is disposed in the accommodating space (S), and includes a plurality of lower joint members 71 which are disposed on an upper major surface of the lower plate 2 and which are spaced apart from each other in the left-and-right direction (X), a plurality of first vertical members 72 which are erected from the lower joint members 71, respectively, to the upper plate 3, a plurality of upper joint members 73 which are disposed on a lower major surface of the upper plate 3, which are spaced apart from each other in the left-and-right direction (X), and which are arranged to alternate with the lower joint members 71 in the left-and-right direction (X), a plurality of second vertical members 74 which extend from the upper joint members 73, respectively, to the lower plate 2, and a plurality of diagonal members 75 each of which extends to interconnect one of the lower joint members 71 and an adjacent one of the upper joint members 73.

Each of the first vertical members 72, the second vertical members 74 and the diagonal members 75 extends in the front-and-rear direction (Y) to terminate at front and rear end edges that are disposed adjacent to the front and rear plates 4, 5, respectively. The front end edge of each of the first vertical members 72 has four notches 721. The front end edge of each of the second vertical members 74 has four notches 741. The front end edge of each of the diagonal members 75 has four notches 751.

The thread formed unit 8 is disposed in the accommodating space (S), and includes four thread formed members 81 which are disposed on a rear major surface of the front plate 4 and which are spaced apart from each other in the upper-and-lower direction (Z). In this embodiment, each of the thread formed members 81 is detachably mounted on the rear major surface of the front plate 4 by means of screw fasteners.

Figure 6:
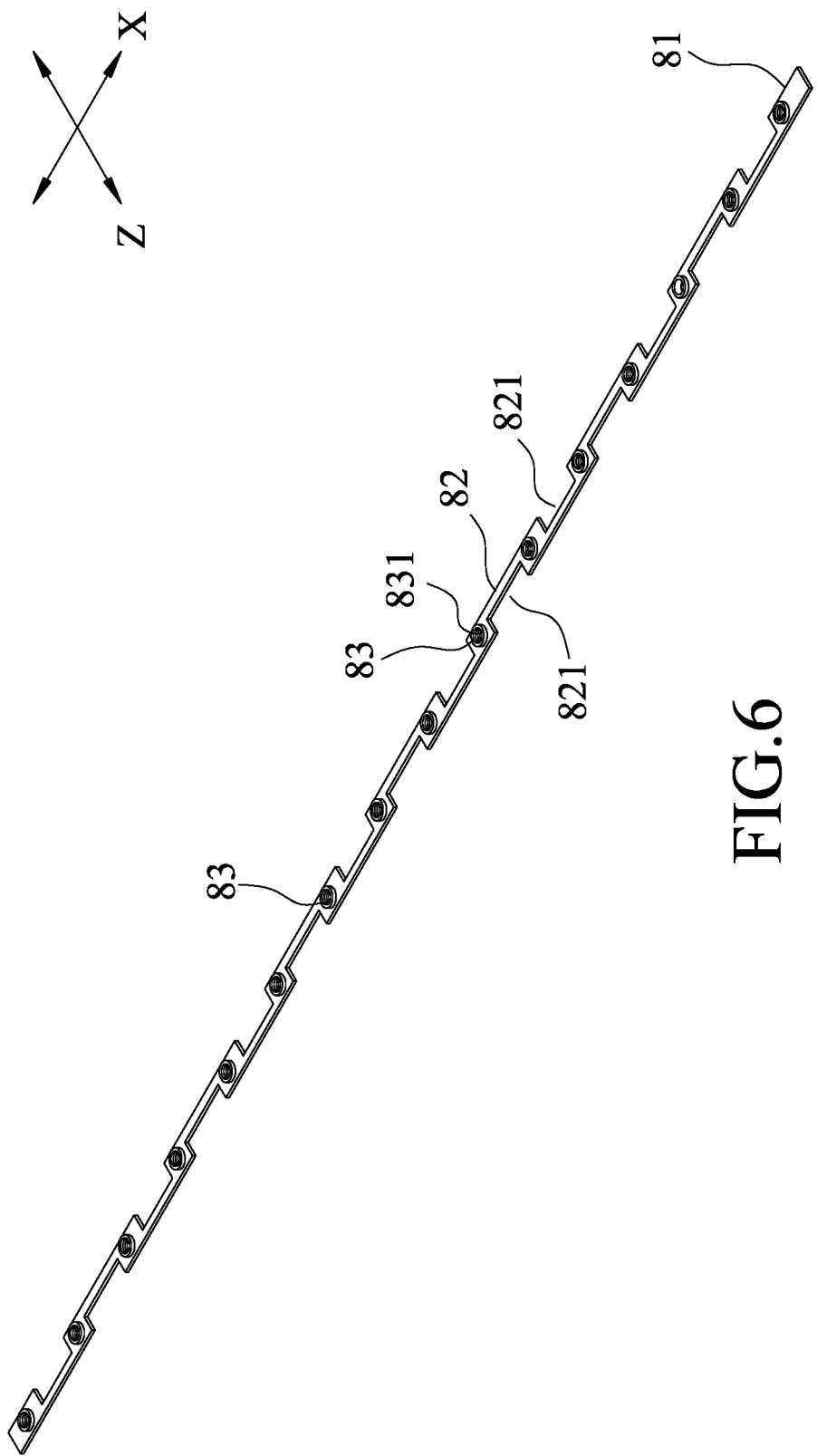
FIG. 6 is a perspective view of a thread formed member of the first embodiment.

With reference to FIGS. 2 and 6, each of the thread formed members 81 has an elongated sheet 82 which is elongated in the left-and-right direction (X) and which extends through the notches 721, 741, 751 that are aligned with each other in the left-and-right direction (X) to be attached to the rear major surface of the front plate 4, and a plurality of threaded portions 83 which are disposed on the elongated sheet 82 and which are spaced apart from each other in the left-and-right direction (X).

The elongated sheet 82 of each thread formed member 81 has a plurality of weight-reducing cutout portions 821 formed therein and cut from an upper end edge or a lower end edge of the elongated sheet 82. In this embodiment, the cutout portions 821 are spaced apart from and alternate with each other in the left-and-right direction (X) so as to evenly reduce the weight of the thread formed member 81.

With reference to FIGS. 2, 5 and 6, each of the threaded portions 83 has an internal thread 831 that extends through the elongated sheet 82 in the front-and-rear direction (Y). The penetrating holes 41 in the front plate 4 are aligned with the threaded portions 83, respectively. In this embodiment, the threaded portions 83 of each thread formed member 81 are integrally formed with the elongated sheet 82 to have the internal threads 831 extending through the elongated sheet 82. Alternatively, each of the threaded portions 83 may be a broaching nut mounted on the elongated sheet 82.

With the truss unit 7 having the first and second vertical members 72, 74 providing support between the upper and lower plates 3, 2, and the diagonal members 75 enhancing the structural strength of the first and second vertical members 72, 74, the beam of this disclosure can be made lighter in weight without compromising the structural strength thereof.

In use, an optical processing device (not shown) is securely mounted on a front major surface of the front plate 4 by virtue of screws that extend through the device and the penetrating holes 41 in the front plate 4 to be threadedly engaged in the internal threads 831 of the corresponding thread formed member 81. Only the thread formed member 81 with the internal threads 831 in a deteriorated condition is required to be replaced (i.e. it is not needed to renew the whole front plate 4), which renders the use and maintenance convenient.

Figure 7:
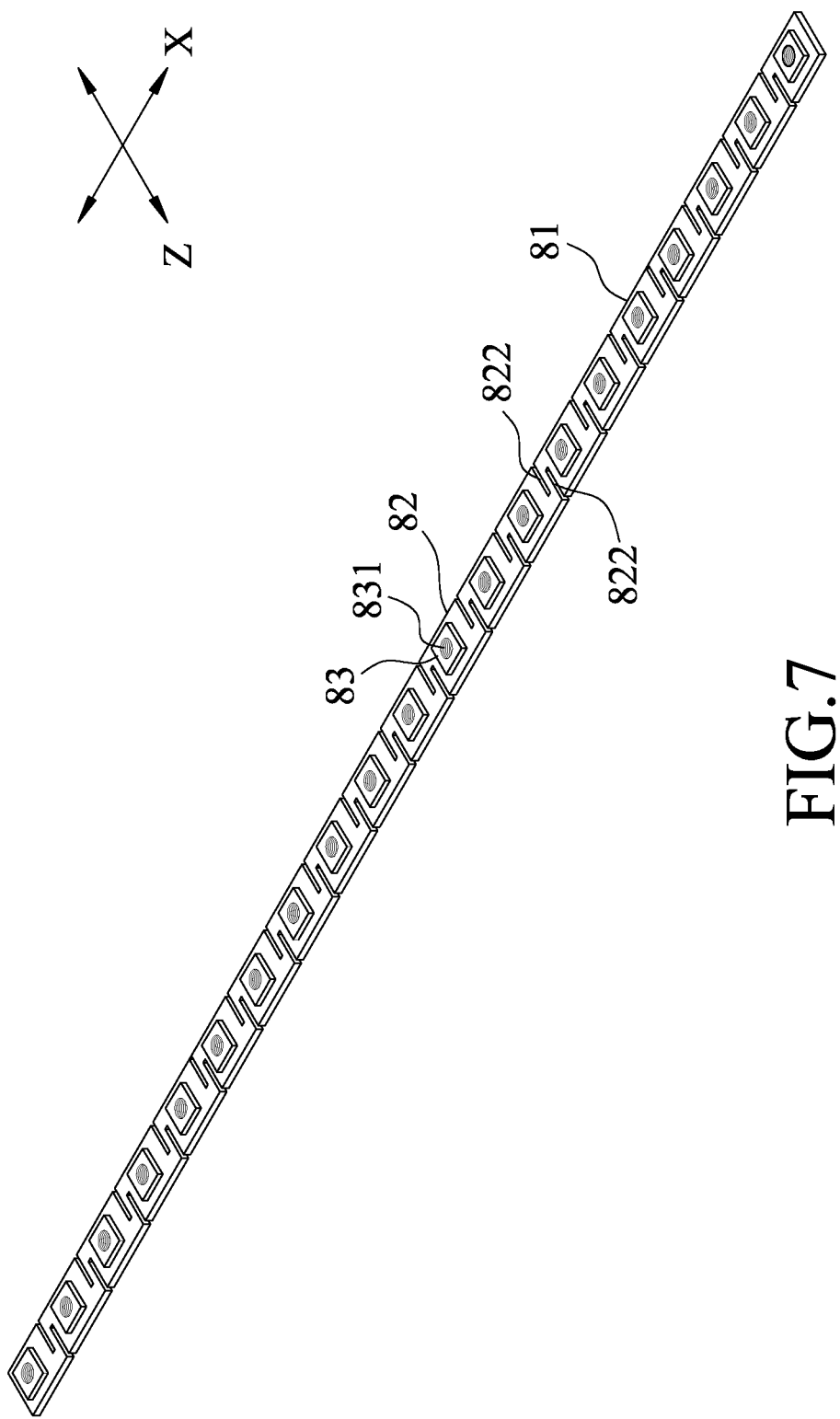
FIG. 7 is a perspective view illustrating a thread formed member of a second embodiment of the beam of a gantry-type stage structure according to the disclosure.

Referring to FIG. 7, in a second embodiment, the elongated sheet 82 of each of the thread formed members 81 has a plurality of thermal compensating slits 822 formed therein and each split from either the upper end edge or the lower end edge of the elongated sheet 82 in the upper-and-lower direction (Z). In this embodiment, the thermal compensating slits 822 are spaced apart from and alternate with each other in the left-and-right direction (X). Moreover, the threaded portions 83 of each thread formed member 81 are square screw nuts securely mounted on the elongated sheet 82 in a welding manner. With the thermal compensating slits 822 permitting deformation of the elongated sheet 82 in case of temperature variation, the positions of the threaded portions 83 can remain stationary to maintain the precision of the optical processing device.

Figure 8:
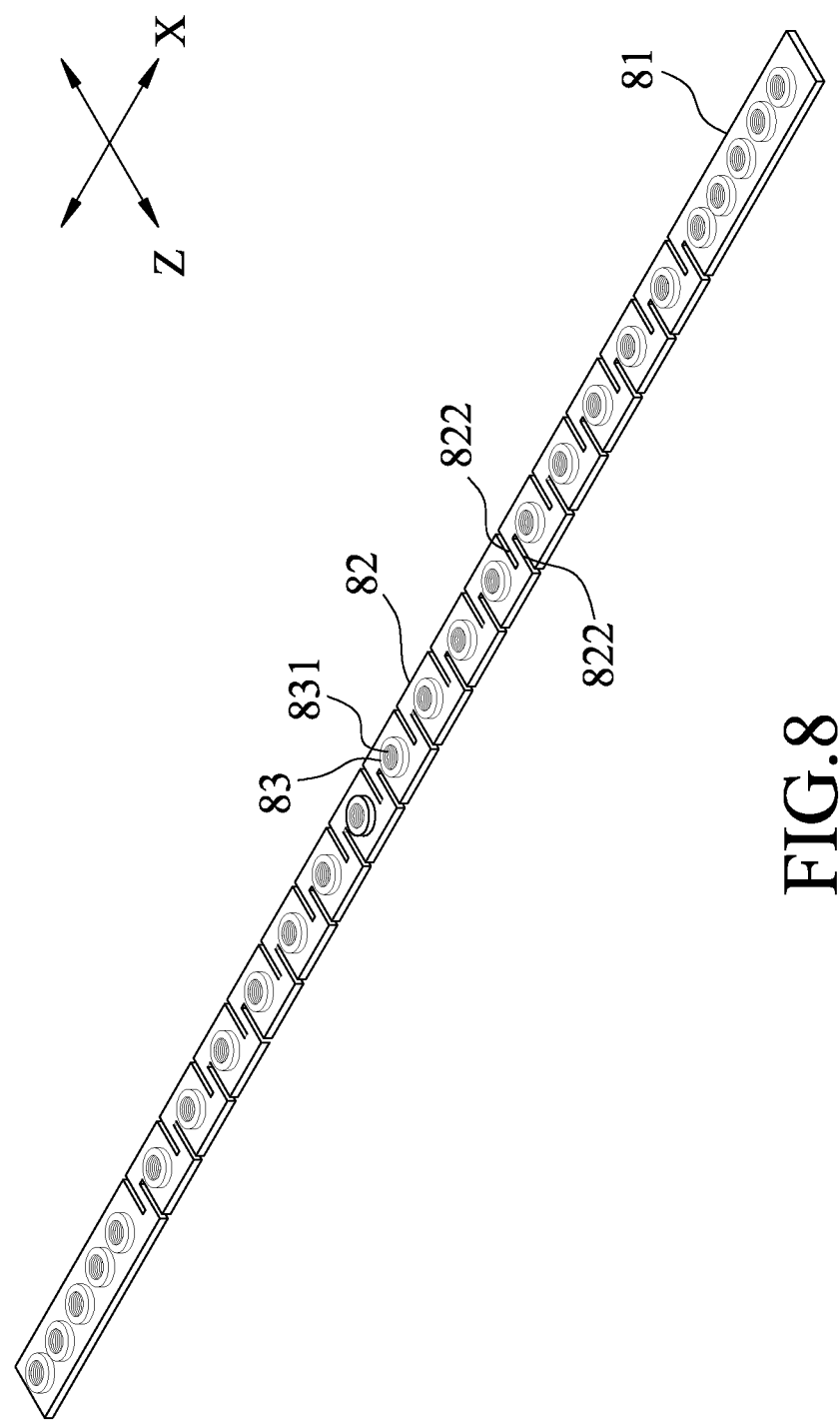
FIG. 8 is a perspective view illustrating a thread formed member of a third embodiment of the beam of a gantry-type stage structure according to the disclosure.

Referring to FIG. 8, in a third embodiment, the threaded portions 83 of each thread formed member 81 are circular screw nuts securely mounted on the elongated sheet 82 in a welding manner.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A beam of a gantry-type stage structure comprising:
   a lower plate elongated in a left-and-right direction to terminate at two lateral end edges, and having a lower front end edge and a lower rear end edge opposite to each other in a front-and-rear direction that is normal to the left-and-right direction;
   an upper plate elongated in the left-and-right direction, and disposed above and spaced apart from said lower plate in an upper-and-lower direction that is normal to both the left-and-right direction and the front-and-rear direction, said upper plate having an upper front end edge and an upper rear end edge opposite to each other in the front-and-rear direction;
   a front plate erected to interconnect said lower and upper front end edges;
   a rear plate erected from said lower rear end edge;
   two lateral plates erected from said lateral end edges, respectively, and each interconnecting said front and rear plates to cooperatively define an accommodating space thereamong;
   a truss unit disposed in said accommodating space, and including a plurality of lower joint members which are disposed on an upper major surface of said lower plate and which are spaced apart from each other in the left-and-right direction, a plurality of first vertical members which are erected from said lower joint members, respectively, to said upper plate, a plurality of upper joint members which are disposed on a lower major surface of said upper plate, which are spaced apart from each other in the left-and-right direction, and which are arranged to alternate with said lower joint members in the left-and-right direction, a plurality of second vertical members which extend from said upper joint members, respectively, to said lower plate, and a plurality of diagonal members each of which extends to interconnect one of said lower joint members and an adjacent one of said upper joint members; and a thread formed unit disposed in said accommodating space, said thread formed unit including a plurality of thread formed members which are disposed on a rear major surface of said front plate and which are spaced apart from each other in the upper-and-lower direction, each of said thread formed members having an elongated sheet which is elongated in the left-and-right direction and which is attached to said rear major surface of said front plate, and a plurality of threaded portions which are disposed on said elongated sheet and which are spaced apart from each other in the left-and-right direction, each of said threaded portions having an internal thread which extends through said elongated sheet in the front-and-rear direction, said front plate having a plurality of penetrating holes which respectively extend in the front-and-rear direction to be aligned with said threaded portions, each of said threaded portions being in the form of a screw nut which is securely mounted on said elongated sheet.

2. A beam of a gantry-type stage structure comprising:

a lower plate elongated in a left-and-right direction to terminate at two lateral end edges, and having a lower front end edge and a lower rear end edge opposite to each other in a front-and-rear direction that is normal to the left-and-right direction;

an upper plate elongated in the left-and-right direction, and disposed above and spaced apart from said lower plate in an upper-and-lower direction that is normal to both the left-and-right direction and the front-and-rear direction, said upper plate having an upper front end edge and an upper rear end edge opposite to each other in the front-and-rear direction;

a front plate erected to interconnect said lower and upper front end edges;

a rear plate erected from said lower rear end edge;

two lateral plates erected from said lateral end edges, respectively, and each interconnecting said front and rear plates to cooperatively define an accommodating space thereamong;

a truss unit disposed in said accommodating space, and including a plurality of lower joint members which are disposed on an upper major surface of said lower plate and which are spaced apart from each other in the left-and-right direction, a plurality of first vertical members which are erected from said lower joint members, respectively, to said upper plate, a plurality of upper joint members which are disposed on a lower major surface of said upper plate, which are spaced apart from each other in the left-and-right direction, and which are arranged to alternate with said lower joint members in the left-and-right direction, a plurality of second vertical members which extend from said upper joint members, respectively, to said lower plate, and a plurality of diagonal members each of which extends to interconnect one of said lower joint members and an adjacent one of said upper joint members; and a thread formed unit disposed in said accommodating space, said thread formed unit including a plurality of thread formed members which are disposed on a rear major surface of said front plate and which are spaced apart from each other in the upper-and-lower direction, each of said thread formed members having an elongated sheet which is elongated in the left-and-right direction and which is attached to said rear major surface of said front plate, and a plurality of threaded portions which are disposed on said elongated sheet and which are spaced apart from each other in the left-and-right direction, each of said threaded portions having an internal thread which extends through said elongated sheet in the front-and-rear direction, said elongated sheet of each of said thread formed members having at least one weight-reducing cutout portion formed therein, said front plate having a plurality of penetrating holes which respectively extend in the front-and-rear direction to be aligned with said threaded portions.

3. The beam as claimed in claim 1, wherein said elongated sheet of each of said thread formed members has at least one thermal compensating slit formed therein.

4. A beam of a gantry-type stage structure comprising:

a lower plate elongated in a left-and-right direction to terminate at two lateral end edges, and having a lower front end edge and a lower rear end edge opposite to each other in a front-and-rear direction that is normal to the left-and-right direction;

an upper plate elongated in the left-and-right direction, and disposed above and spaced apart from said lower plate in an upper-and-lower direction that is normal to both the left-and-right direction and the front-and-rear direction, said upper plate having an upper front end edge and an upper rear end edge opposite to each other in the front-and-rear direction;

a front plate erected to interconnect said lower and upper front end edges;

a rear plate erected from said lower rear end edge;

two lateral plates erected from said lateral end edges, respectively, and each interconnecting said front and rear plates to cooperatively define an accommodating space thereamong;

a truss unit disposed in said accommodating space, and including a plurality of lower joint members which are disposed on an upper major surface of said lower plate and which are spaced apart from each other in the left-and-right direction, a plurality of first vertical members which are erected from said lower joint members, respectively, to said upper plate, a plurality of upper joint members which are disposed on a lower major surface of said upper plate, which are spaced apart from each other in the left-and-right direction, and which are arranged to alternate with said lower joint members in the left-and-right direction, a plurality of second vertical members which extend from said upper joint members, respectively, to said lower plate, and a plurality of diagonal members each of which extends to interconnect one of said lower joint members and an adjacent one of said upper joint members, each of said first vertical members, said second vertical members and said diagonal members extend in the front-and-rear direction to respectively terminate at front and rear end edges that are disposed adjacent to said front and rear plates; and a thread formed unit disposed in said accommodating space, said thread formed unit including a plurality of thread formed members which are disposed on a rear major surface of said front plate and which are spaced apart from each other in the upper-and-lower direction, each of said thread formed members having an elongated sheet which is elongated in the left-and-right direction and which is attached to said rear major surface of said front plate, and a plurality of threaded portions which are disposed on said elongated sheet and which are spaced apart from each other in the left-and-right direction, each of said threaded portions having an internal thread which extends through said elongated sheet in the front-and-rear direction.

5. The beam as claimed in claim 4, wherein said front end edge of each of said first vertical members, said second vertical members and said diagonal members has a plurality of notches which are configured to permit said thread formed members to extend therethrough.

\* \* \* \* \*